US012585002B2

(12) United States Patent
Jensen et al.

(10) Patent No.: US 12,585,002 B2
(45) Date of Patent: Mar. 24, 2026

(54) INTERFEROMETRIC DUAL-COMB DISTANCE MEASURING DEVICE AND MEASURING METHOD

(71) Applicant: HEXAGON TECHNOLOGY CENTER GMBH, Heerbrugg (CH)

(72) Inventors: Thomas Jensen, Rorschach (CH); Frank Pryzgodda, Lindau (DE)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 775 days.

(21) Appl. No.: 18/078,638

(22) Filed: Dec. 9, 2022

(65) Prior Publication Data

US 2023/0194683 A1     Jun. 22, 2023

(30) Foreign Application Priority Data

Dec. 22, 2021     (EP) .................................... 21216931

(51) Int. Cl.
*G01S 7/487*          (2006.01)
*G01B 11/00*          (2006.01)
(Continued)

(52) U.S. Cl.
CPC ............ *G01S 7/487* (2013.01); *G01B 11/005* (2013.01); *G01S 7/4811* (2013.01); *G01S 17/10* (2013.01)

(58) Field of Classification Search
CPC ............ G01B 9/02003; G01B 9/02007; G01B 9/02008; G01B 11/026; G01B 9/02015; G01B 9/02001; G02F 2203/56; G02F 1/21; G02F 2203/50; G02F 1/383; G02F 2/02; G02F 1/365; G02F 1/025; G01J 3/10; G01J 3/45; G01J 9/00; G02B 6/4215; G02B 5/18; G02B 27/10; G02B 27/30; G01S 17/08; G01S 17/32; G01S 7/4815; G01S 17/10; G01S 7/481; G01S 7/4865; G01S 17/06;
(Continued)

(56) References Cited

U.S. PATENT DOCUMENTS 8,705,953 B2     4/2014   Schriefer
11,789,148 B2   10/2023   Stutz et al.
(Continued)

FOREIGN PATENT DOCUMENTS

CN          104635237 A      5/2015
CN          105589074 A      5/2016
(Continued)

OTHER PUBLICATIONS

CN Office Action dated Jul. 10, 2025 as received in Application No. 202211623473.8.
(Continued)

*Primary Examiner* — Sanjiv D. Patel
(74) *Attorney, Agent, or Firm* — Maschoff Brennan

(57) ABSTRACT

An opto-electronic dual-comb interferometric distance measuring method and device wherein a signal comb is chromatically divided into a target signal comb and a non-target signal comb at a emission position, preferably by an optical interleaver in a measurement probe of the device. Only the target signal comb serves as a free beam emitted to the target. The non-target signal comb serves for generation of additional or compensation internal phase differences. Thus, the distance to the target is based on first, target related phase differences and on the second, internal compensation phase differences.

16 Claims, 4 Drawing Sheets

(51) Int. Cl.
    *G01S 7/481*         (2006.01)
    *G01S 17/10*       (2020.01)

(58) Field of Classification Search
    CPC .......... G01S 17/34; G01S 17/36; G01S 17/58;
                G01S 7/4816; G01S 7/491; G01S 7/4911
    See application file for complete search history.

(56)            References Cited

U.S. PATENT DOCUMENTS

| | | |
|---|---|---|
| 2015/0131078 A1 | 5/2015 | Soreide et al. |
| 2020/0363187 A1 | 11/2020 | Haverkamp |

FOREIGN PATENT DOCUMENTS

| | | | |
|---|---|---|---|
| CN | 110865382 A | 3/2020 | |
| CN | 111208487 A | 5/2020 | |
| DE | 10 2009 012 646 A1 | 9/2010 | |
| DE | 10 2019 207 192 A1 | 11/2020 | |
| EP | 2 182 319 A1 | 5/2010 | |

OTHER PUBLICATIONS

Jutta Mildner et al., "Dual-frequency comb generation with differ-ing GHz repetition rates by parallel Fabry-Perot cavity filtering of a single broadband frequency comb source," Measurement Science and Technology, vol. 27, Issue 7, pp. 1-8 (May 31, 2016).

David R. Carlson et al., "Dual-comb interferometry via repetition-rate switching of a singlefrequency comb," Arxiv, vol. 43, Issue 15, pp. 3614-3617 (Jun. 14, 2018).

Extended European Search Report dated Jun. 7, 2022 as received in Application No. 21216931.2.

INTERFEROMETRIC DUAL-COMB DISTANCE MEASURING DEVICE AND MEASURING METHOD

BACKGROUND

The present disclosure relates to an electro-optical distance measuring device and a method for distance measuring.

Various principles and methods are known in the field of electronic and/or electro-optical distance measuring. One approach is to emit pulsed electromagnetic radiation, for example, laser light, toward a target to be measured, the distance to which is to be determined, and subsequently to receive an echo from this target as a backscattering object. To make the point on the target object targeted for the measurement recognizable, visible light can be used in this case. The reflected optical radiation is converted into an electrical signal in the device by a photosensitive element. Optical components for beamforming, deflection, filtering, etc.—for example, lenses, wavelength filters, mirrors, etc.—are often located in the optical emitting and/or receiving path in this case.

The distance to the target to be measured can be determined, for example, on the basis of the runtime of the pulse or emission pattern, and/or the phase of the pulse within a modulation cycle. Such laser distance meters have become widespread by now as standard solutions in many fields, for example, geodesy, metrology or industrial surveying, for example, in the form of total stations, laser scanners, electronic distance meters (EDMs), coordinate measuring machines (CMMs) or laser trackers. This applies for instance to the manufacturing industry, for which non-contact gauging and checking of surfaces of workpieces is very important.

To ascertain the run-time of the signal, on the one hand, the so-called time-of-flight (TOF) method is known, which ascertains the time between the emission and reception of a light pulse, wherein the time measurement is performed on the basis of the flank, the peak value, or another characteristic of the pulse form. Pulse form is understood in this case as a chronological light intensity curve of the reception signal, especially of the received light pulse—acquired by the photosensitive element.

On the other hand, the so-called phase measurement principle is known, which ascertains the signal run-time by comparison of the phasing of the electromagnetic radiation of the emitted and received signals. Also combinations of TOF-scheme and interferometry are known in the art.

Distance meters having stabilized frequency comb lasers are known in the field of interferometric distance measurement, for example using pulsed operation from DE 10 2009 012 646 A1. These comprise tunable resonators for high-precision distance measurements (ppm accuracy), to stabilize the pulse rate or pulse frequency—typically at pulse lengths around 100 fs—so that it is regulated with ppm accuracy, and also CEP stabilization (carrier envelope phase). This stabilization effectuates consistency of the optical wavelength and phase.

Regarding interferometric schemes, optical frequency combs can be used to stabilize the frequency interval between continuous-wave (CW) lasers used in synthetic-wavelength interferometry. Dual-comb schemes are also known, which rely on multiheterodyne detection by coherent superposition of a pair of slightly detuned frequency combs (often called "signal comb" and "local comb"). For distance measurements, each comb is split, e.g. by a fiber-based 50:50 coupler. Of each comb, one part is directly sent to a detector ("reference detector"). The resulting baseband signal contains discrete beat notes or frequencies. The other part of the signal comb is routed to the target and back to another photodetector ("measurement detector"), where it is detected together with the second part of the local comb, resulting in another baseband signal containing discrete beat notes. The distance to the target is extracted from the phase (difference) of the baseband beat notes, the phase difference resulting from the optical path to the target.

However, in reality the phase is not only changed by or dependent on the optical path/distance to the target but also by other reasons. For example, the optical path length and therewith phase is influenced by heat dissipation within the measuring device. In view of today's high demands on distance measuring accuracy, even small temperature changes and therewith changes in optical path length are unacceptable. As countermeasure, the measuring device can be stabilized with respect to temperature. However, this is complicated and sometimes even impossible, for example for devices with non-integral design, for example a CMM, where measurement radiation is routed along vast optical paths to a probe or measurement head.

Another countermeasure is disclosed by the DE 102019207192 A1, proposing to integrate the complete optical measurement components into the probe head, using PIC-technology (PIC, photonic integrated circuit). However, the probe is not passive but dissipated heat itself, negatively influencing measurement stability. As another disadvantage, the focus position or direction of the emitted free beam is fixed in contrast to a fiber-coupled probe. Further, standard components cannot be used anymore, in particular frequency comb laser modules and components.

SUMMARY

The object of the present disclosure is therefore to provide an improved distance measuring device and distance measuring method.

A further object is to provide a distance measuring device and distance measuring method which compensates for disturbing influences along the optical measurement path.

This object is achieved by the implementation of the characterizing features describe herein. Features which refine the disclosure in an alternative or advantageous manner is also disclosed.

The disclosure relates to a method for distance measuring namely an opto-electronic dual-comb interferometric distance measuring method for measuring a distance to a target, in particular the distance from an optical reflective surface in a measuring probe to the optical reflecting surface of a target object. The method comprises generating first frequency comb radiation—denoted local comb—and generating second frequency comb radiation—denoted signal comb. Preferably, the local comb and the signal comb are frequency stabilized and have a free spectral range in between 10 Ghz and 500 GHz and/or a frequency shift or basic offset in between 1 GHZ and 50 GHz.

First beat frequencies—denoted reference beat frequencies—are generated by superposing of local comb and signal comb having travelled along defined (device internal) optical paths. That is, reference local comb radiation and reference signal comb radiation are mixed wherefrom first beat frequencies as a reference can be determined.

As in principle known in the art, these first beat frequencies are used as reference for determining a respective phase difference or shift of second beat frequencies—denoted measurement beat frequencies—which result from super-posing of local comb having travelled along a defined optical path and signal comb having travelled to and back from the target as a free beam. The mixed signal comb used for measuring gives a different phase compared to the mixed signal comb used for reference due to that only the first has travelled to the target. Hence, first phase differences are determined which are a result of the distance to the target travelled by a portion of the signal comb.

According to the disclosure, the signal comb for measuring the target is chromatically split at the point of emission (meaning directly at or nearby). Only a portion of this signal comb—denoted target signal comb—is then emitted as said free beam and travelling to the target. The other portion is directed back without being emitted, i.e. it is not directed as a free beam to the target.

This additional signal beam portion—denoted non-target (or internal) signal comb-serves for generating of third beat frequencies—denoted compensation beat frequencies—by superposing it with local comb (having travelled along a defined optical path). Therewith, second phase differences are determined between the reference beat frequencies and the compensation beat frequencies. These second phase differences are independent of the distance to the target as this part of the signal comb has not travelled to the target.

However, the first phase differences and the second phase differences both represent all the optical path from the comb source to the point of emission where there is the splitting. Seen the other way round, they differ only in the optical path or distance to the target the measurement signal comb has travelled but the non-target signal comb not. Thus, by determining the distance to the target based on the first and on the second value of phase difference, all phase difference not being related to the target distance can be compensated or cancelled out. In particular, changes in optical path length due to temperature change effects both the non-target signal comb and the target signal comb resp. both the first and the second phase differences to the same extent such that a target distance determination based on a comparison of the first and second phase difference remains unchanged.

For example, the target distance is determined by determining a first distance value out of a first gradient of phase difference (of the first phase differences) and by determining a second distance value out of a second gradient of phase difference (of the second phase differences) and subtracting the second distance value from the first distance value.

Preferably, the splitting of the signal comb directly before emission is a periodically chromatically splitting, for example with a period of 50 GHz. As a further option, the signal comb is split into odd and even modes by the chromatically splitting. Alternatively, there is a chromatically splitting of the signal comb by band-pass filtering.

The present disclosure also relates to an opto-electronic dual-comb interferometric distance measuring device for measuring a distance to a target, the device comprising a first frequency comb source for providing a first or local frequency comb radiation and a second frequency comb source for providing a second or signal frequency comb radiation.

The device further comprises an electronic analyzing unit designed for determination of a distance to a target based on first phase differences, in particular in form of a first gradient of phase difference, between first or reference beat frequencies generated by superposition of first (solely) internally travelling local comb and (solely) internally travelling signal comb, and second or measurement beat frequencies generated by superposition of second (solely) internally travelling local comb and signal comb travelling to and back from the target as a free beam by emission/transmission by a measurement probe, the probe preferably being a fiber-coupled probe.

According to the disclosure, the device is designed for determination by the electronic analyzing unit of a distance to a target based on the first and on second phase differences, in particular in form of a second gradient of phase difference, of third or compensation beat frequencies and the reference beat frequencies.

Therefore, the measurement probe comprises a first optical frequency comb separation/splitting element for chromatic separation of signal comb into non-target signal comb and target signal comb, whereby only the latter serves as said free beam. The compensation beat frequencies then are generated by superposition of second internally travelling local comb and the internally travelling non-target signal comb. Therefore, the second internally traveling local comb can be split into two (spectral) portions like the signal comb is split.

The first optical splitting element preferably is situated in the measurement probe such that the internal and target signal comb have a maximal common internal optical path. For example, the optical splitting element is the optical element substantially concluding the internal optical path or is the last optical element before the emission.

As a preferred option, the first frequency comb splitting element is embodied as an optical interleaver, in particular a multi-mirror Fabry-Perot interleaver. These optical elements are in particular well suited for separation of frequency combs. They allow to cut a comb into subsequent frequency ranges such that the transmitted (measurement) comb as well as the reflected (compensation) comb still cover the whole frequency range or wavelength spectrum, only with greater free spectral range. For example, a signal comb with an initial free spectral range of 100 GHz results in an internal comb and a target comb with free spectral range of 200 GHz each. Alternatively, the first frequency comb splitting element is embodied as chromatic beam splitter which separates the signal beam into a first frequency range and a second frequency range without changing the original free spectral range.

As another option, the measurement probe is passive, excluding any electronic or electric components. As still another option, the probe is structurally separated from and fiber coupled to the frequency comb sources. Such a design provides the advantage that the probe is not tied to a case as such but can be positioned "anywhere". As the disclosure provides the advantage that all influences to the optical path such as temperature change the way to the probe are compensated, an unrestricted arrangement of the measurement probe is possible, without any necessity to considerate heat isolation or the like. This is for example particularly advantageous if the device is embodied as a coordinate measuring machine where the core or central components like radiation sources and detectors are very remote to the probe head.

In preferred embodiments, there is a common routing of the non-target signal comb and received target signal comb, whereby the device comprises a second optical separation/splitting element of identical optical properties as the first one for separation of the signals of the superposed non-target signal comb and the superposed target signal comb before detection.

Preferably, the first and—if present—second optical separation element is fiber coupled or the measuring device as a whole is embodied as a fiber-optic measuring device.

Thus, there is provided a dual-comb distance measuring device wherein part of the laser comb for measuring the target is split off by an optical splitting element, preferably embodied as an interleaver, before emitting the measuring comb to the target. This split off comb underlies the same conditions as the actual measuring comb all the way up to and from the probe (resp. to the point of emission) and carries these "markings" or characteristics/effective length of the optical path in its phase (shift) as the measuring comb does whereby the measuring comb has the additional phase shift by the target distance. Hence, this additional purely target related phase shift can be extracted or separated from the overall phase shift of the measurement comb (resp. the according phase differences to the reference beat notes) by cancelling the phase shift or "marking" caused by the propagation way to and from the probe using the split off comb which purely represents this propagation path. Said otherwise, the phase shift unrelated to the target distance is "known" or at least implicitly sizeable or available and hence eliminable by evaluation of the split off comb resp. mutual evaluation of both the measurement result of both the non-target signal comb and the target signal comb.

The present disclosure also relates to a non-transitory computer program product, comprising program code which is stored on a machine-readable medium, in particular of an opto-electronic dual-comb interferometric distance device, and having computer-executable instructions which when executed cause a computer to perform the method.

BRIEF DESCRIPTION OF THE DRAWINGS

The method according and the device are described in greater detail solely by way of example hereafter on the basis of specific exemplary embodiments schematically illustrated in the drawings, wherein further advantages are also described.

In the specific figures.

DETAILED DESCRIPTION

Figure 1:
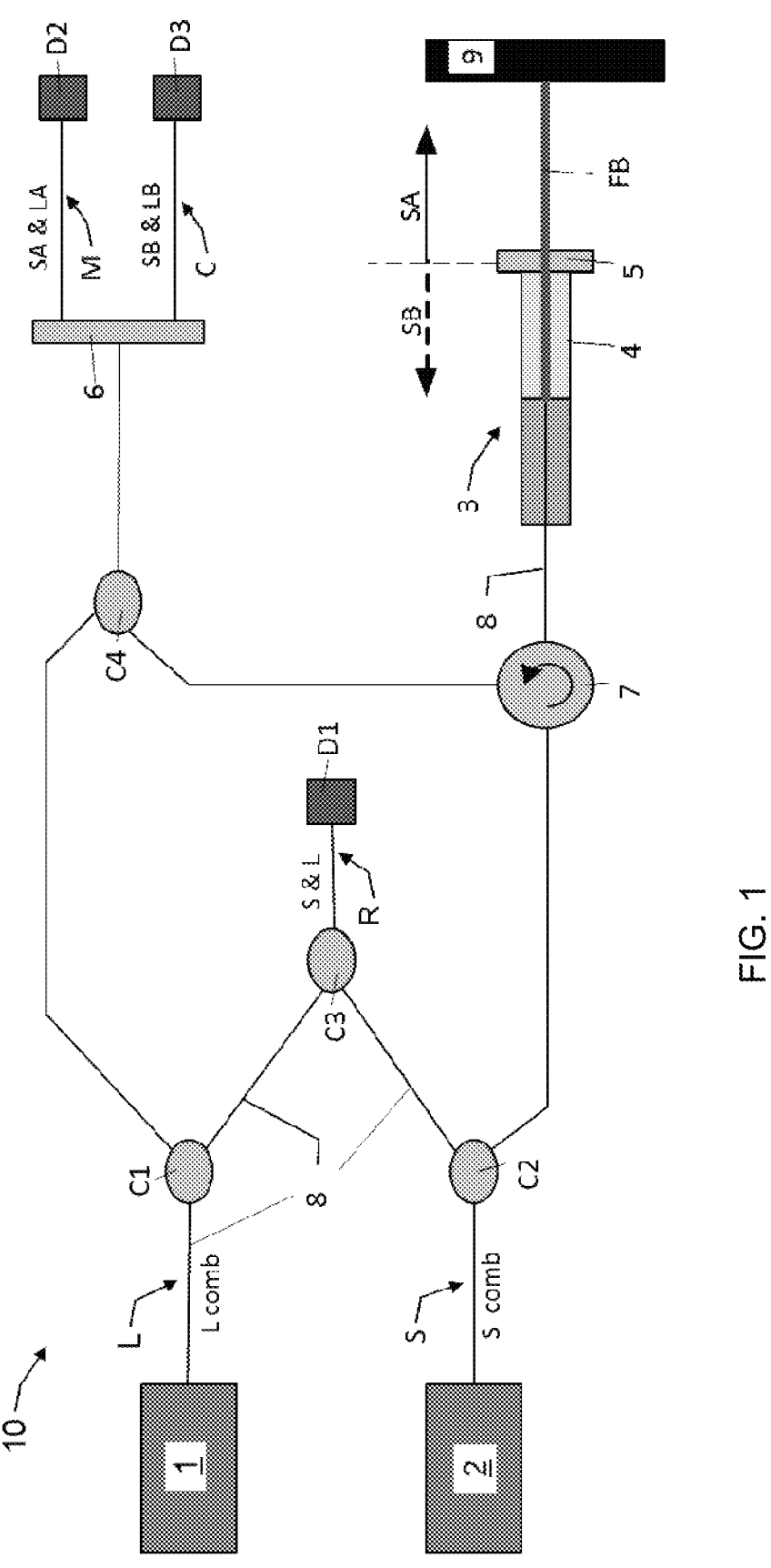
FIG. 1 shows an exemplary embodiment of an interferometric dual-comb distance measuring device.

FIG. 1 shows a first exemplary embodiment of an interferometric dual-comb distance measuring device 10 and/or distance measuring method for measuring a distance to a target 9. The device 10 comprises two frequency comb lasers with frequency stabilization: a first one, called local oscillator 1, which generates a first frequency comb radiation L, called local comb, and a second one, called signal oscillator 2, which generates a second frequency comb radiation S, called signal comb. The radiation sources 1, 2 are for example micro resonators which are mode-coupled with slightly different free spectral range (mode distance) for instance in the range of hundred Gigahertz, e.g. 100.00 GHz and 100.01 GHz. The radiation sources 1, 2 can have a common radiation generator, e.g. a common underlying laser or pump diode the generated light of which is split into two portions, or the radiation sources 1, 2 may be embodied as two completely separate units, e.g. two separate comb generators, e.g. based on microresonators. Preferably, fiber-based lasers are used as they provide a high mechanical stability in comparison to solid-state free beam lasers, for example, with respect to vibrations or shocks, which is advantageous in particular in the case of mobile distance meters. In any case, the frequency spectra of the radiation sources 1, 2 have for instance a basic frequency shift of several GHz, e.g. 20 GHz. An example for the frequency spectra of comb L and S is given in FIG. 2.

Using optical fibers 8 and optical splitters C1, C2, each comb can be partly routed to a coupler C3 for superposition of (first) local comb L and signal comb S, which both travel purely internal optical paths. The resulting mixed spectrum S&L, gives first beat frequencies, called reference beat frequencies R, which are detected by a first optical detector D1. Such a detector like detector D1 is, for example, a PIN diode (positive intrinsic negative diode) based on InGaAs semiconductor material for wavelengths around 1.5 μm. The detector D1 preferably behaves in an energy-sensitive manner, so that electrons released by ultrashort laser pulses, which especially frequency comb based devices can provide, are not lost, but rather contribute to the electrical detector signal.

The reference beat frequencies R serve as interferometric reference for determining distance to the target 9 using a phase shift to a measurement signal and therefrom length of time dependent on a distance to the target 9 as in principle known in the art and further described below. An example of reference beat frequencies R resp. a mixed spectrum is given in FIG. 5a.

Radiation S of the signal source 2 is routed by optical fiber 8 by another optical path to a measurement probe 3 which serves for emitting and receiving radiation to and from the target 9 to be measured. Received radiation is phase shifted compared to the internally travelling signal due to the different length of optical path, comprising the distance to the target 9, which thus can be determined based on phase shifts or phase differences.

The exemplary measurement probe 3 is as said fiber coupled and fully passive. There might be a fiber connector (not shown) between the probe 3 and the circulator 7 or an electro-optical interface to exchange probes of different optical beam parameters (beam direction, working range, etc.). This provides the advantage that the probe 3 can be structurally separated from the laser sources 1, 2 or from a main body or "heart" of the measuring device 10, allowing for a substantially free and unrestricted placement of the probe 3 dependent on the specific measurement circumstances, which is for instance particularly needed in metrological devices such as a coordinate measurement machine (CMM). Further, as the probe 3 is passive, there is no need for a power supply for the probe 3 and no electrical exhaust heat is generated which otherwise leads to a temperature change which would negatively influence measurement stability/accuracy or raise the need for additional means for temperature stabilizing, which drastically raises complexity of the design and often are not capable of completely eliminating all temperature influences.

As said, the difference in the reference optical path and the measurement optical path, the latter being dependent on the range to the target 9, results in a phase difference which is used for determining this range. However, the length of the measurement optical path changes not only with change of the distance to the target 9 but is prone to environmental changes, too. In particular temperature changes influence the effective optical path length and thus can lead to errors in the determined distance. As said, it is complicated and often impossible to eliminate such environmental influences, in particular if a flexible or unrestricted mount of the measurement probe 3 is wanted or a compact design with nearby warming electric units is to be achieved.

Thus, the present disclosure provides a method and means for compensation of such changes in length of the measurement path. The idea is to provide a signal SB which underlies these length changes but not the distance to the target 9 by splitting of the signal comb S before emitting. This allows for a separation of comb S into a comb signal SB unrelated to the target distance and a comb signal SA expressive of the target distance.

The device 10 comprises in the example an optical interleaver as a comb beam splitting element 5 at the very end of the measurement probe 5, situated "behind" a lens 4 of probe 3 in emitting or exit direction. The optical interleaver 5 is for example of the Fabry-Perot-element type with multiple dielectric layers, creating a repetitive band pass structure, periodically transmitting and reflective, allowing for periodic spectral separation of signal comb S as periodic signal. The fiber coupled interleaver 5 of the example has an internal miniaturized free beam optics.

The interleaver 5, situated at the point of emission of the free beam for measuring the target 9, has the effect that recurrently portions of the signal beam SA are transmitted as measurement free beam FB, propagating to the target 9 and being reflected therefrom, whereas another portions of the signal beam SB do not leave probe 3 but is reflected. The periodic separation of the signal comb S is further exemplified by FIG. 4.

Preferably, the separation of the signal beam is at the utmost point of the probe 3 such that the common optical path of non-target signal comb SA and the target signal comb SB is maximized, wherefore the separate optical path of the measurement signal beam SB is substantially only the free beam passage from the point of exit to the target 9 and back. Thus, the non-target signal comb SA and target signal comb SB differ due to the distance or propagation to the target 9 of target comb SB; all other influences to signal comb are shared resp. represented in both combs SA, SB.

Accordingly, both internal or non-target comb SB after reflection at interleaver 5 and target comb SA after reflection at target 9 and reentry by probe 3 travel via optical fiber 8 and circulator 7 to coupler C4 where they are superposed with (second) local comb L, wherefore the local comb L is accordingly split into spectral portions LA, LB. The mixed radiation is routed to a second interleaver 6 which behaves identical to the first interleaver 5 and enables a separate routing of the SA&LA-radiation to a second detector D2 and of the SB&LB-radiation to a third detector D3. The periodic separation of the mixed combs by second interleaver 6 is further exemplified by FIG. 5.

Hence, second or measurement beat frequencies M of the target signal comb SA and the local comb L are detected by detector D2 and third or signal beat frequencies C of the non-target signal comb SB and the local comb L are detected by detector D3. Example for second and third measurement beat frequencies M, C are given with respect to FIG. 5b. As an alternative to two separate detectors D2, D3, a single or common detector may be used for detection of both signals SA&LA and SB&LB, e.g. by a detection-array.

As already mentioned above, the beat frequencies M, C of the measurement arm detected by detectors D2, D3 are phase shifted with regard to the reference beat frequencies R of the reference arm detected by detector D1 due to different optical paths. As not only one measurement optical path is present but due to the splitting by probe interleaver 5 two different measurement optical paths, different phase shifts for the non-target signal comb SB and the target signal comb SA are present. This difference in phase shift represents the difference in optical path of internal comb SB and measurement signal comb SA, namely the distance to the target 9 wherefore the target distance can be determined from a difference of the phase shift of the internal probe signal comb SB and of the external probe signal comb SA. The distance determination based on difference in phase shift of target signal SA and internal signal SB is further exemplified with respect to FIG. 6.

Figure 2:
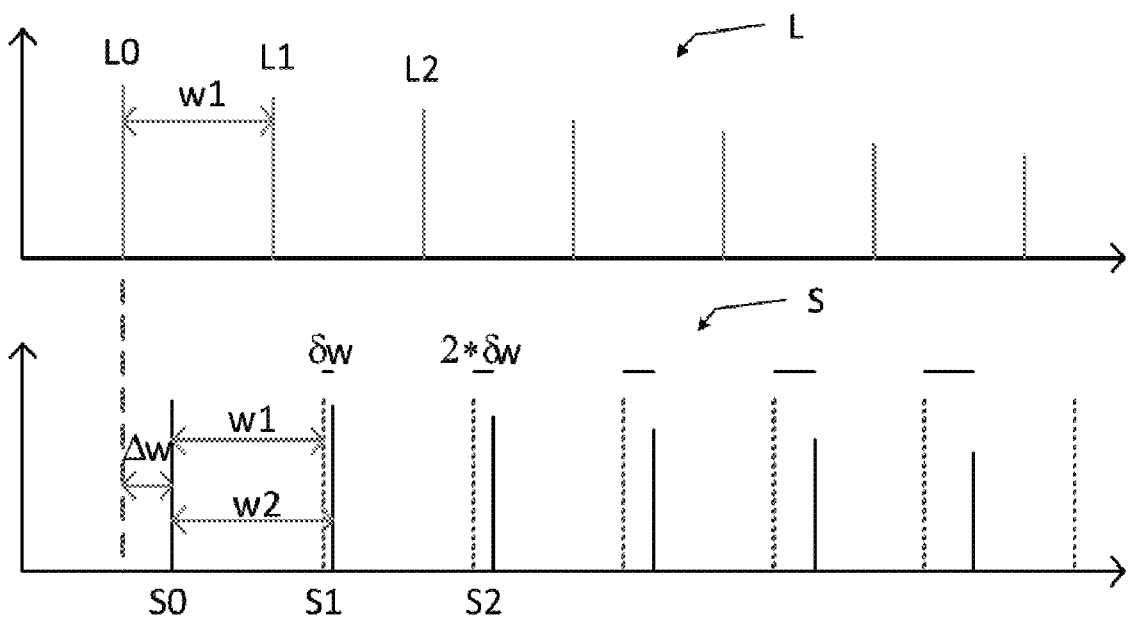
FIG. 2 shows exemplary optical spectra of the local frequency comb and signal frequency comb.

FIG. 2 shows exemplary optical spectra of the local frequency comb L and signal frequency comb S. Both spectra show multiple lines or modes L0, L1, L2, resp. S0, S1, S2, . . . Besides a basic offset $\Delta w$ in wavelength, for example S0 being 20 GHz higher than L0, the frequency spacing w1 of the local comb L is (slightly) different to the frequency spacing w2 of the signal comb S. Accordingly, the wavelength shift $\lambda w$ multiplies with the line number/mode number.

Figures 4, 5A, 5B:
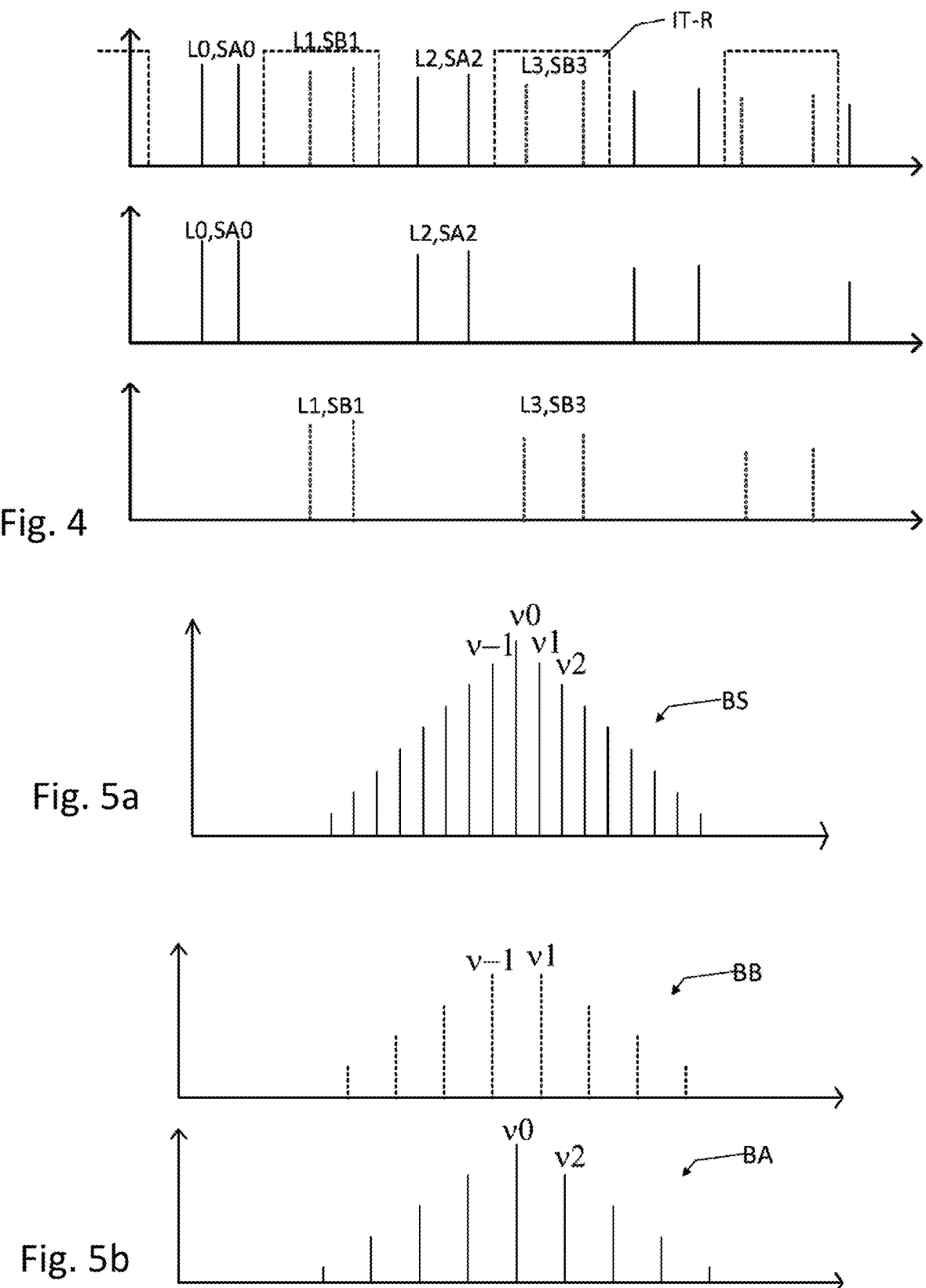
FIG. 4 schematically illustrates the superposition of local comb and internal and target signal comb.
FIG. 5a,b illustrate schematic examples of resulting mixed frequency spectra.

Beat notes or frequencies are received by superposition of local comb L and signal comb S (see FIG. 5a). Using stabilized radiation sources, these beat frequencies provide a stable and well detectable frequency spectrum around a central frequency v0 and being typically in the MHz-range.

Figure 3:
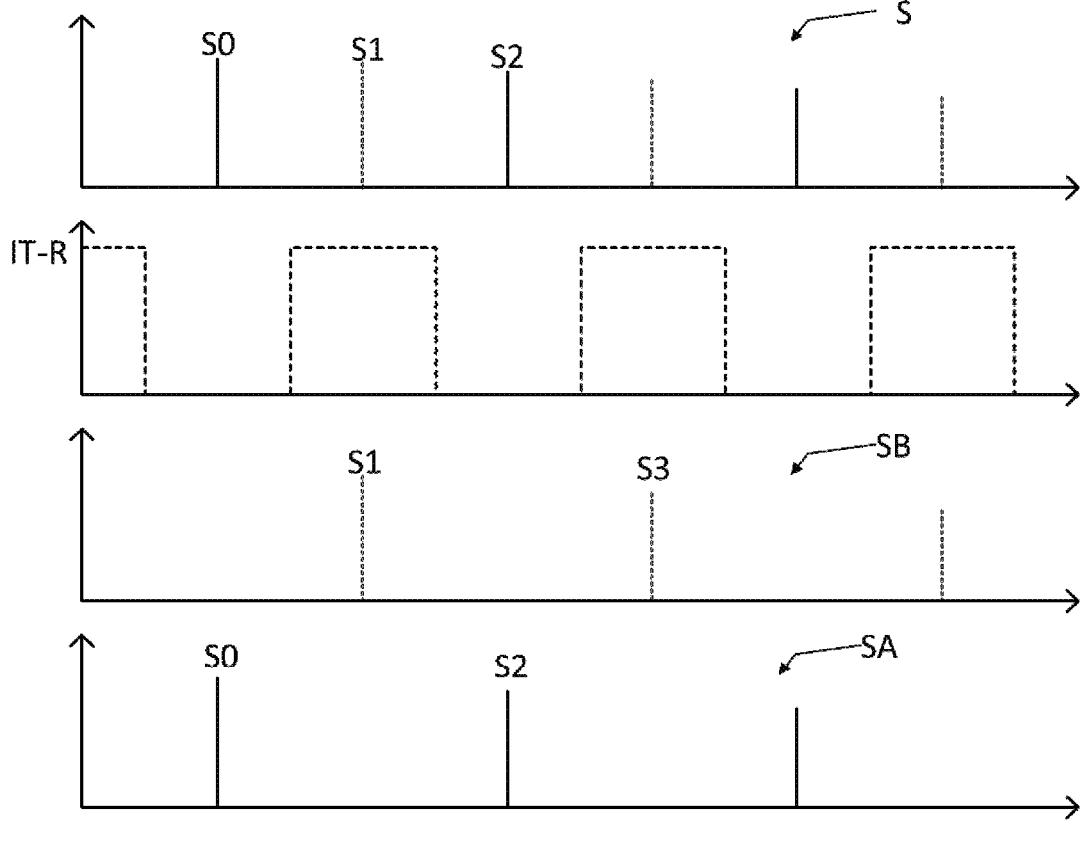
FIG. 3 shows an example of splitting of the signal comb into portions for measuring the target and portions for compensation purposes.

FIG. 3 shows an example of splitting of the signal comb S into portions SA for measuring the target and portions SB for compensation purposes. In the upper part of FIG. 3, the full signal comb S as it reaches the measurement probe is depicted like in FIG. 2, showing all modes with modes S0, S1, S2, . . . .

The signal comb S enters the interleaver via an input port. The interleaver has a periodic reflective behavior IT-R as schematically depicted in the second graph of the figure. As a result, only the even modes S0, S2, . . . pass the interleaver and form the target signal comb SA, whereas the odd modes S1, S3, . . . are reflected and form the non-target signal comb SB. Only the target signal comb SA is emitted to the target, whereas the non-target signal comb SB is routed back inside the device to be detected without any relation to the target distance.

An alternative to the alternating separation of the signal beam S as depicted, a band pass filtering can be used such that e.g. modes of lower order are separated and transmitted to the target as target signal SA whereas modes of higher order form the internal/non-target signal SB.

In any case, to the point of separation (resp. point of "reunion" seen in direction of free beam reception) in or at the measurement probe, the signal comb S resp. both parts SA, SB share a common optical path and accordingly underlie the same influences or conditions. Hence, the non-target part SB can serve as a reference or standard for compensation or cancelling of these influences which allows for clearly distinguishing or separating them from the influence of the target distance which is to be determined.

As mentioned, the reference signal comb SB and the measurement signal comb SA received from the target by the measurement probe, are routed by an optical fiber to be mixed with local comb for beat note generation.

FIG. 4 schematically illustrates the superposition of local comb L and internal and target signal comb SB,SA. As the target signal comb SA comprises only the even modes S0,S2, . . . , these mix with the even modes of the local comb L0, L2, . . . . The non-target signal comb SB has the odd modes S1, S3, . . . wherefore these mix with the odd modes of the local comb L1, L3, . . . .

In the upper part of the figure, the mixed signals of respective modes are shown: the central mode of local comb and target signal comb L0,SA0, the first mode of local comb and reference signal comb L1,LSB1, the second mode of local comb and target signal comb L2,SA2, the third mode of local comb and reference signal comb L3,SB3 . . . .

In order to separate these modes/beat frequencies for separate detection thereof, a second interleaver of same optical properties than the one of the measurement probe is used, with a repetitive reflection behavior IT-R as indicated by the rectangles in the upper graph of FIG. 4 (cf. also second upper graph of FIG. 3).

The interleaver outputs by a first output port the signals (even modes) related to the target signal comb L0,SA0, . . . (SA&L in FIG. 1), illustrated in the middle of FIG. 4. By a second output, the signals related to the non-target signal comb (odd modes) L1,SB1, . . . (SB&LB in FIG. 1) are provided. As the interleaver has a fixed frequency-stabilized filter spectrum, however, the spectra of the local comb and the signal comb are slightly detuned to each other (cf. FIG. 2), high mode orders cannot be clearly separated any more above a certain number. Nevertheless, several hundred mixed frequencies still will be available which is sufficient for distance determination.

FIG. 5b illustrates schematic examples of the resulting separated mixed frequency spectra BA of the target signal and BB of the compensation signal. For comparison, the mixed frequency spectrum BS of the complete signal comb and local comb is depicted in FIG. 5a which shows all beat frequencies v, even and odd. The diagram of FIG. 5a can be seen as a schematic example of beat frequencies as detected by detector D1, detecting the mixed reference radiation.

To the contrast, the spectrum BA shown in the lower part of FIG. 5b related to the target signal comprises only even beat frequencies v-2, v0, v2, . . . . The spectrum BA shown in the upper part of FIG. 5b related to the non-target signal comb comprises only odd beat frequencies v-1, v1, v3, . . . .

Figure 6:
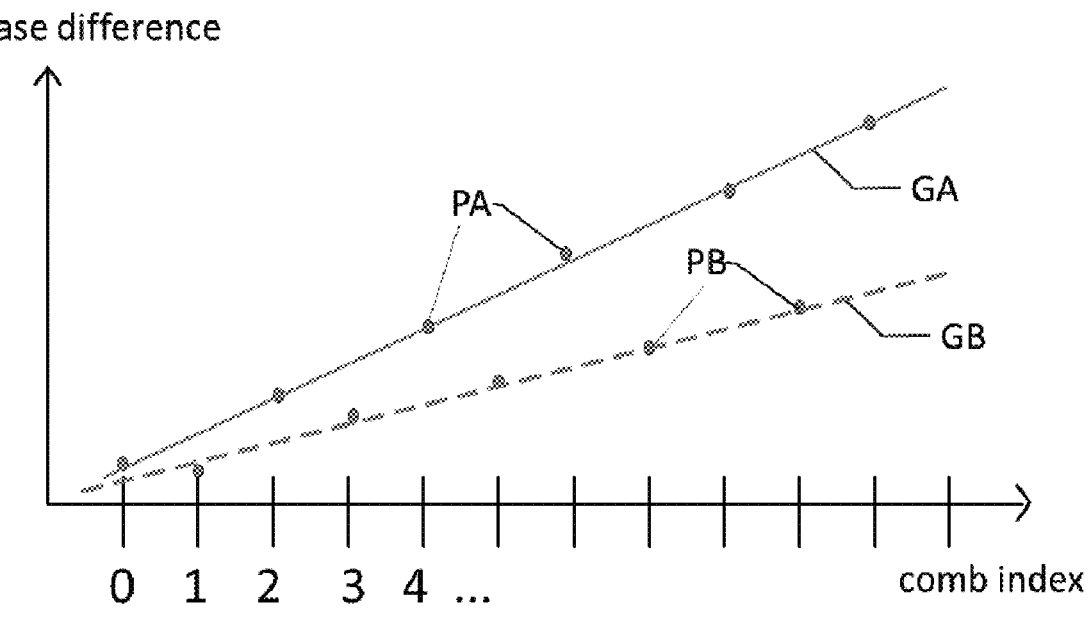
FIG. 6 schematically shows an example of the evaluation of the phase shift between the reference beat frequencies and the compensation and measurement beat frequencies.

FIG. 6 shows schematically the evaluation of the phase shift between the reference beat frequencies and the respective beat frequencies of the signal arm. The signals detected by detectors D1-D3 (see FIG. 1) are Fourier-transformed and separated in single frequency signals. The phase is determined for each frequency signal vi or comb index 0, 1, 2, 3, 4, . . . of the reference signals as well as the respective phase for the measurement signals.

Then, the difference of the respective start phases of the reference signal detected by detector D1 and target signal detected by detector D2 resp. D3 are determined which are indicated in the depicted phase difference diagram by the values (points) for a respective comb index: PA (even comb indices) indicating phase difference for the target signal comb and PB (odd comb indices) indicating phase difference for the non-target signal comb.

According to the two different signal paths of internal and target signal comb, two groups of phase differences are the result, each representing a signal run-time and therewith a travel distance. Each group can for example be described by a respective linear fit or gradient, a first phase difference gradient GA for the target signal and a second phase difference gradient GB for the compensation signal. Each gradient is proportional to a certain delay of time value and thus indicative of a travelled distance value.

Accordingly, a first distance value $L_A$ is determined from the first gradient GA and a second distance value $L_B$ from the second gradient GB. The distance to the target finally is the difference between these two values: $L=L_A-L_B$. This difference of the two derived values is only dependent on the target range and independent of any change of optical path length within the device resp. of the optical path from the laser source to the beam exit as such changes influence both phase difference gradients resp. first and second distance value $L_A$, $L_B$ in the same manner.

Figure 7:
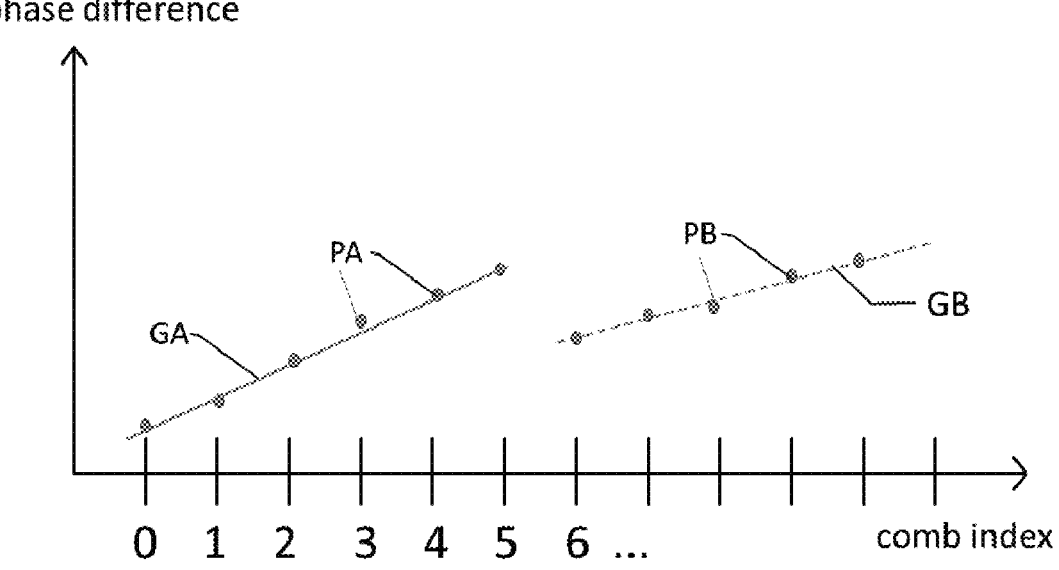
FIG. 7 schematically shows another example of the evaluation of the phase shift between the reference beat frequencies and the compensation and measurement beat frequencies.

FIG. 7 shows schematically the evaluation of the phase shift between the reference beat frequencies and the respective beat frequencies of the signal arm for the above mentioned alternative of signal separation by band pass filtering. Such a band pass filtering does not provide a periodic or alternating separation of modes but a separation into two mode or frequency intervals. As schematically indicated in the figure, this results in a number of phase differences PA for lower modes for the target signal comb (in the example up to comb index 5) and a second number of phase differences PB for higher modes for the non-target signal comb (in the example starting with comb index 6). Hence, a first gradient of phase difference GA for the lower modes can be determined and a second gradient of phase difference GB for the higher modes. However, the alternative approach with periodic filtering using e.g. an interleaver is preferred to the band pass filtering approach depicted as periodic filtering allows to use or average over the complete available mode range (complete range of even modes and complete range of odd modes) for both the target path and the internal path (cf. FIG. 6). By repetitive or periodical splitting, there is no cut in mode or phase difference but only a thinning out. In addition, the laser pulse form is not changed by periodic filtering, whereas it is changed by band pass filtering though in similar fashion for all combs.

It is obvious that these illustrated figures only schematically illustrate possible exemplary embodiments. The various approaches can also be combined with one another and with devices or methods of the prior art if not mentioned otherwise.

The invention claimed is:

1. An opto-electronic dual-comb interferometric distance measuring method for measuring a distance to a target comprising:

generating first frequency comb radiation—denoted local comb—and generating second frequency comb radiation—denoted signal comb— generating of first beat frequencies—denoted reference beat frequencies—by superposing of a local comb and signal comb having travelled along defined optical paths, generating of second beat frequencies—denoted measurement beat frequencies—by superposing of local comb having travelled along a defined optical path and signal comb having travelled to and back from the target as a free beam from an emission position, determining of first phase differences, in particular in form of a first gradient of phase difference, between the reference beat frequencies and the measurement beat frequencies, chromatically dividing signal comb into a target signal comb and a non-target signal comb at the emission position, only the target signal comb serving as said free beam emitted to the target, generating of third beat frequencies—denoted compensation beat frequencies—by superposing of local comb having travelled along a defined optical path and the non-target signal comb, determining of second phase differences, in particular in form of a second gradient of phase difference, between the reference beat frequencies and the compensation beat frequencies, and determining the distance to the target based on the first and the second phase difference.

2. The method according to claim 1, further comprising determining the distance by determining a first distance value out of a first gradient of phase difference and a second distance value out of a second gradient of phase difference and subtracting the second distance value from the first distance value.

3. The method according to claim 1, further comprising periodically chromatically splitting the signal comb.

4. The method according to claim 1, wherein the signal comb is split into odd and even modes by the chromatically splitting.

5. The method according to claim 1, further comprising chromatically splitting the signal comb by band-pass filtering.

6. The method according to claim 1, wherein the local comb and the signal comb are frequency stabilized and have:

a free spectral range in between 10 GHz and 500 GHz and/or a frequency shift in between 1 GHZ and 50 GHz.

7. An opto-electronic dual-comb interferometric distance measuring device for measuring a distance to a target, the device comprising a first frequency comb source for providing a first frequency comb radiation—denoted local comb—and a second frequency comb source for providing a second frequency comb radiation,—denoted signal comb—and an electronic analyzing unit, the electronic analyzing unit being designed for determination of a distance to a target based on first phase differences, in particular in form of a first gradient of phase difference, between:

first beat frequencies—denoted reference beat frequencies—generated by superposition of first internally travelling local comb and internally travelling signal comb, and second beat frequencies—denoted measurement beat frequencies—generated by superposition of second internally travelling local comb and signal comb travelling to and back from the target as a free beam by emission by a measurement probe, wherein the device is configured to determinate a distance to a target based on the first phase differences and on second phase differences, in particular in form of a second gradient of phase difference, of third beat frequencies—denoted compensation beat frequencies—and the reference beat frequencies and wherefore:

the measurement probe comprises a first frequency comb separation element for chromatic division of signal comb before emitting into non-target signal comb and target signal comb, only the target signal comb serving as said free beam, and the compensation beat frequencies being generated by superposition of second internally travelling local comb and the internally travelling non-target signal comb.

8. The device according to claim 7, wherein the first optical separation element is situated in the measurement probe such that the non-target signal comb and the target signal comb have a maximal common internal optical path, in particular wherefore the first optical separation element is the optical element concluding the internal optical path.

9. The device according to claim 7, wherein the first frequency comb separation element is embodied as an optical interleaver, in particular a multi-mirror Fabry-Perot interleaver.

10. The device according to claim 7, wherein the first frequency comb separation element is embodied as chromatic frequency comb beam splitter.

11. The device according to claim 7, wherein the measurement probe is passive.

12. The device according to claim 7, wherein the measurement probe is structurally separated from and fiber coupled to the frequency comb sources.

13. The device according to claim 7, wherein a second optical separation element of identical optical properties as the first one for separation of the signals of the superposed non-target signal comb and the superposed target signal comb before detection.

14. The device according to claim 7, wherein the first and second optical separation element is fiber coupled.

15. The device according to claim 7, wherein the device is embodied as a coordinate measuring machine.

16. A non-transitory computer program product, comprising program code which is stored on a non-transitory machine-readable medium, and having computer-executable instructions which when executed cause a computer to perform the method according to claim 1.

* * * * *